Spherical Aberration
Sine Condition

Distortion

Astigmatism

Spherical Aberration
Sine Condition

Distortion

Astigmatism

INVENTOR.
YASUO TAKAHASHI
BY Stanley Wolder
ATTORNEY

United States Patent Office 3,501,224
Patented Mar. 17, 1970

3,501,224
ZOOM LENS HAVING FOUR LENS GROUPS
Yasuo Takahashi, Tokyo-to, Japan, assignor to Asahi Kogaku Kogyo Kabushiki Kaisha, Tokyo-to, Japan, a corporation of Japan
Filed Jan. 24, 1967, Ser. No. 611,411
Int. Cl. G02b $15/00$, $9/00$
U.S. Cl. 350—184                               2 Claims

ABSTRACT OF THE DISCLOSURE

A variable focus photographic lens of four groups including a four lens positive first group, a four lens negative second group, a three lens positive third group and a four lens fourth group and satisfying the following conditions:

$$0.15 < F_1/f_6 < 0.65$$
$$|n_{10} - n_{11}| < 0.1$$
$$0.12 < |r_{16}|/|F_3| < 0.2$$
$$n_9 > 1.62$$
$$0.2 < |r_{21}|/|F_4| < 0.3$$
$$n_{12} > 1.62$$
$$0.45 > r_7/|F_1| > 0.28$$

wherein the lenses are designated 1 to 15 consecutively and the faces or surfaces of lenses 1 to 6 are designated 1 to 12 consecutively, the faces of lenses 7 to 10 are designated 12 to 19 and the faces of lenses 11 to 15 are designated 19 to 28, $F_n$ is the focal length of the subscript designated lens group, $n_n$ is the index of refraction of the subscript designated lens, $r_n$ is the radius of curvature of the subscript designated lens face and $f_6$ is the resultant focal length of the first three lenses. The second and fourth lens groups are simultaneously movable relative to the first and second lens groups.

BACKGROUND OF THE INVENTION

The present invention relates generally to an improved lens system and it relates particularly to an improved photographic objective zoom lens, that is, a lens system whose magnifying power or focal length can be continuously varied or adjusted without disturbing or shifting the position of the image.

The zoom lenses of the present nature which have been heretofore available or proposed possess an important drawback and disadvantage in that a high degree of aberration is experienced in a large range of adjusted focal positions of the lens system thereby seriously limiting its resolution and usefulness. In the conventional design of zoom lenses it has been common to balance the aberrations at maximum and minimum focal lengths with a resulting high degree of aberration over a large range of focal lengths between the maximum and minimum focal lengths.

SUMMARY OF THE INVENTION

The principal object of the present invention is to provide an improved variable focal length lens system.

Another object of the present invention is to provide an improved photographic objective lens system wherein the focal length is adjustable without any shifting of the image position.

Still another object of the present invention is to provide a photographic zoom lens system of the above nature characterized by the low degree of aberration over the full range of adjustment of the focal length of the lens system.

The present invention, in a sense, contemplates the provision of a variable focus objective lens system comprising four lens groups successively designated 1 to 4, the lens groups including four lenses, four lenses, three lenses and four lenses respectively and possessing the following dimensions and relationships:

$$0.15 < F_1/f_6 < 0.65$$
$$|n_{10} - n_{11}| < 0.1$$
$$0.12 < |r_{16}|/|F_3| < 0.2$$
$$n_9 > 1.62$$
$$0.2 < |r_{21}|/|F_4| < 0.3$$
$$n_{12} > 1.62$$
$$0.45 > r_7/|F_1| > 0.28$$

wherein the lenses are designated 1 to 15 consecutively and the faces of lenses 1 to 6 are designated 1 to 12 consecutively, the faces of lenses 7 to 10 are designated 12 to 19 and the faces of lenses 11 to 15 are designated 19 to 28, $F_n$ is the focal length of the subscript designated lens group, $n_n$ is the index of refraction of the subscript designated lens, $r_n$ is the radius of curvature of the subscript designated lens face and $f_n$ is the resultant focal length up to the $n$th face as contrasted with the focal lengths $F_1$, $F_2$, $F_3$ and $F_4$.

The focal length of the lens system is varied by the simultaneous axial movement of the second and fourth lens groups relative to the first a third lens groups.

A lens system satisfying the above conditions obviates the drawbacks and disadvantages of the photographic zoom lens systems heretofore available in that coma aberration at both long and short focal lengths of incident light rays remote from and close to the center of the lens is minimized and spherical aberration throughout the full focal length range is minimized.

DESCRIPTION OF THE PREFERRED EMBODIMENT

Figure 1A:
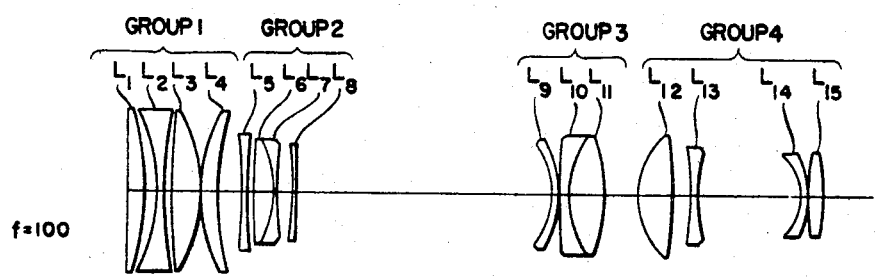
FIGURE 1(A) is a longitudinal sectional view of a lens system embodying the present invention illustrated adjusted to a short focal length.
Figure 1B:
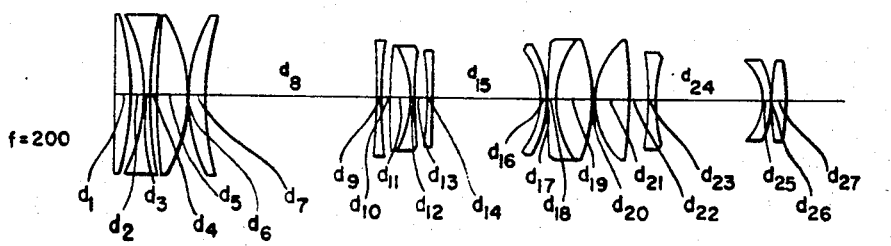
FIGURE 1(B) is a view similar to FIGURE 1(A) illustrating the lens system adjusted to a medium focal length.
Figure 1C:
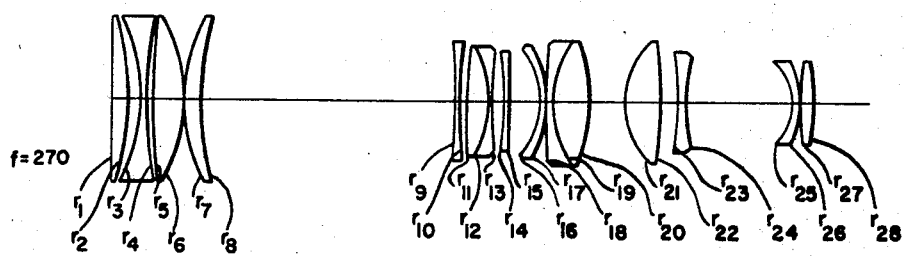
FIGURE 1(C) is a view similar to FIGURE 1(A) illustrating the lens system adjusted to a long focal length.

Referring now to the drawings and particularly FIGURES 1(A) to 1(C) thereof which illustrate a preferred embodiment of the present invention, the improved lens system comprises four successive groups of lenses identified from the front to the rear consecutively as the first to the fourth lens groups respectively. The first lens group is relatively stationary and is a positive lens system including four consecutive lenses $L_1$, $L_2$, $L_3$ and $L_4$ and has a resultant focal length $F_1$. The first lens $L_1$ is a positive lens with a flat front first surface of radius $r_1$ and a convex rear second surface of radius $r_2$ and an axial thickness of $d_1$; the second lens $L_2$ is a double concave lens of axial thickness $d_3$ with a front surface of radius $r_3$ axially spaced from the second surface a distance $d_2$ and a rear fourth surface of radius $r_4$, the third surface being of greater curvature than the fourth surface; the third lens $L_3$ is a double convex lens of axial thickness $d_5$ with a front fifth surface of radius $r_5$ axially spaced from the fourth surface a distance $d_4$ and a rear sixth surface of greater curvature than the fifth surface and of radius $r_6$; and the fourth lens $L_4$ is positive and of an axial thickness $d_7$ with a convex front seventh surface of radius $r_7$ axially spaced from the sixth surface a distance $d_6$ and a rear concave eighth surface of radius $r_8$.

The second lens group is axially movable to effect the variation of the lens magnifying power and is a negative lens system having a resultant focal length $F_2$ and includes four lenses designated $L_5$, $L_6$, $L_7$ and $L_8$ respectively. The fifth lens $L_5$ is a double concave lens of an axial thickness $d_9$ with a front ninth surface of radius of curvature $r_9$ axially spaced from the eighth surface a variable distance $d_8$ and a rear tenth surface of a radius of curvature $r_{10}$ approximately equal to $r_9$; the sixth and seventh lenses $L_6$ and $L_7$ have cemented mating twelfth surfaces of radius $r_{12}$, the sixth lens $L_6$ of axial thickness $d_{11}$ having a front eleventh surface of radius $r_{11}$ axially spaced from the tenth surface a distance $d_{10}$ and the seventh lens $L_7$ of axial thickness $d_{12}$ having a rear thirteenth surface of radius of curvature $r_{13}$, the surface 12 being of greater curvature than those of the surfaces 11 and 13; and the eighth lens $L_8$ is a double concave lens of thickness $d_{14}$ with a front fourteen face of radius of curvature $r_{14}$ of greater curvature than the rear fifteen face thereof which has a radius of curvature $r_{15}$ and axially spaced a distance $d_{13}$ from the thirteenth surface.

The third lens group is relatively stationary and is a positive lens system with a resultant focal length $F_3$ and including three lenses $L_9$, $L_{10}$, and $L_{11}$ respectively. The ninth lens $L_9$ is a negative meniscus lens of thickness $d_{16}$ with a front concave fifteenth surface of radius $r_{15}$ axially spaced a variable distance $d_{15}$ from the fourteenth surface and a rear convex sixteenth surface of radius $r_{16}$ and of lesser curvature than the fifteenth surface; and the tenth and eleventh lenses $L_{10}$ and $L_{11}$ have cemented mating nineteenth surfaces of radius of curvature $r_{19}$, the tenth lens $L_{10}$ of axial thickness $d_{18}$ being a double concave lens having a front eighteenth surface of radius of curvature $r_{18}$ axially spaced from the seventh surface a distance $d_{17}$ and the eleventh lens $L_{11}$ being a double convex lens of axial thickness $d_{19}$ having a rear twentieth surface of radius of curvature $r_{20}$, the nineteenth surface being of greater curvature than that of the eighteenth and twentieth surfaces.

The fourth lens group is movable by a known mechanism simultaneously with the movement of the second lens group to vary the magnifying power of the lens system and includes four lenses $L_{12}$, $L_{13}$, $L_{14}$ and $L_{15}$ respectively, two of which are positive and two of which are negative with a resultant focal length $F_4$. The twelfth lens $L_{12}$ is a double convex lens of axial thickness $d_{21}$ with a front twenty-first surface of radius of curvature $r_{21}$ axially spaced from the twentieth surface a variable distance $d_{20}$ and a rear twenty-second surface of radius $r_{22}$ and of lesser curvature than the twenty-first surface; the thirteenth lens $L_{13}$ is double concave and of an axial thickness $d_{23}$ and has a front twenty-third surface having a radius of curvature $r_{23}$ and axially spaced from the twenty-second surface a distance $d_{22}$ and a rear twenty-fourth surface of radius of curvature $r_{24}$, and of greater curvature than the twenty-third surface; the fourteenth lens $L_{14}$ is a negative meniscus lens of an axial thickness $d_{25}$ with a concave front twenty-fifth surface of radius of curvature $r_{25}$ axially spaced from the twenty-fourth surface a distance $d_{24}$, and a convex rear twenty-fifth surface of radius of curvature $r_{25}$ and of lesser curvature than the twenty-fourth surface; and the fifteenth lens $L_{15}$ is a double convex lens of axial thickness $d_{27}$ with a front twenty-seventh surface of radius of curvature $r_{27}$ axially spaced from the twenty-sixth surface a distance $d_{26}$ and a rear twenty-eighth surface of radius of curvature $r_{28}$ and of lesser curvature than the twenty-seventh surface.

In accordance with the present invention the lens system satisfies the following conditions:

$$0.15 < F_1/f_6 < 0.65$$
$$|n_{10} - n_{11}| < 0.1$$
$$0.12 < |r_{16}|/|F_3| < 0.2$$
$$n_9 > 1.62$$
$$0.2 < |r_{21}|/|F_4| < 0.3$$
$$n_{12} > 1.62$$
$$0.45 > r_7/|F_1| 0.28$$

Wherein $n_n$ is the index of refraction of the $n$th or correspondingly subscript designated lens $L_n$, $f_6$ is the resultant focal length of lenses $L_1$, $L_2$ and $L_3$, and the remaining symbols are as previously described.

A variable focal length objective lens system of the above structure and satisfying the above specified condition is highly corrected for spherical, coma and other aberrations.

Thus, due to the conditions:

$$0.15 < F_1/f_6 < 0.65$$
and
$$0.45 > r_7/|F_1| > 0.28$$

it is possible to prevent aggravation of coma aberration of light rays of points of incidence remote from the lens center at relatively long focal lengths, and also, in association with other conditions, the spherical aberration is minimized throughout the full focal length variation range.

The condition:

$$|n_{10} - n_{11}| < 0.1$$

prevents aggravation of coma aberration of light rays at points of incidence relatively near the lens center.

Further, the condition $$0.12 < |r_{16}|/|F_3| < 0.2$$
$$n_9 > 1.62$$
$$0.2 < |r_{21}|/|F_4| < 0.3$$
$$n_{12} > 1.62$$

prevents aggravation of coma aberration in the relatively short focal length range, and further, in association with other conditions, keeps the spherical aberration highly corrected.

The following is the data of a specific lens system according to the present invention as shown in FIGURE 1, satisfying the above conditions:

1:4.5   $f = 100 \sim 270$ mm.

| | r | d | n |
|---|---|---|---|
| 1 | ∞ | 4.50 | 1.52630/51.0 |
| 2 | −166.077 | 3.00 | |
| 3 | −99.000 | 1.50 | 1.60562/43.9 |
| 4 | 231.100 | 2.00 | |
| 5 | 465.000 | 8.50 | 1.51633/64.1 |
| 6 | −89.613 | 0.10 | |
| 7 | 96.500 | 4.00 | 1.51633/64.1 |
| 8 | 164.013 | 5.00~101.98 | |
| 9 | −350.000 | 2.50 | 1.72000/50.3 |
| 10 | 387.539 | 2.50 | |
| 11 | −550.000 | 6.00 | 1.74077/27.7 |
| 12 | −63.385 | 2.50 | 1.67000/51.7 |
| 13 | 351.918 | 2.84 | |
| 14 | −200.000 | 1.50 | 1.72000/50.3 |
| 15 | 1148.125 | 105.00~8.02 | |
| 16 | −46.500 | 2.84 | 1.64000/60.2 |
| 17 | −63.780 | 0.28 | |
| 18 | −1370.000 | 2.13 | 1.60562/43.9 |
| 19 | 60.960 | 10.00 | 1.65160/58.5 |
| 20 | −102.539 | 13.00~1.99 | |
| 21 | 47.000 | 8.00 | 1.65100/55.8 |
| 22 | −317.405 | 7.50 | |
| 23 | −169.000 | 3.00 | 1.74000/28.2 |
| 24 | 101.145 | 50.68 | |
| 25 | −27.500 | 2.50 | 1.72342/38.0 |
| 26 | −48.171 | 0.15 | |
| 27 | 200.000 | 5.80 | 1.69895/30.0 |
| 28 | −124.236 | | |

The Seidel coefficient sums of the above lens system are as follows:

```
              Seidel    (when F=100)
                        EP=1.2 mm.
              S₁       S₂        S₃        P         S₅
SUM.......   0.4580   0.2356   -0.0508   -0.0333    1.2230
              Seidel    (when f=270)
                        EP=1.5 mm.
              S₁       S₂        S₃        P         S₅
SUM.......   0.8206  -0.6116    1.1050   -0.0891   -3.5310
              EP=Position of entrance pupil
```

Figure 2A:
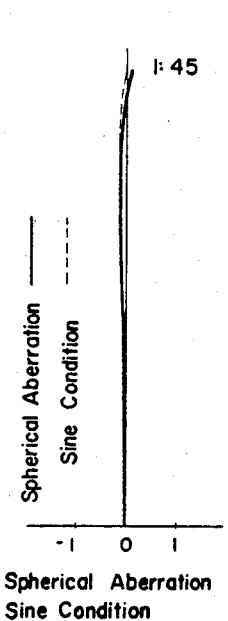
FIGURES 2(A), 2(B) and 2(C) are, respectively, the curves of spherical aberration and sine condition, distortion, and astigmatism of said lens system at its short focal length.
Figure 2B:
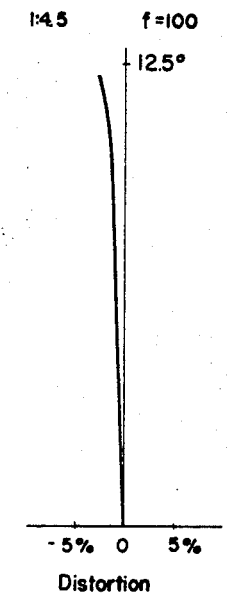
Figure 2C:
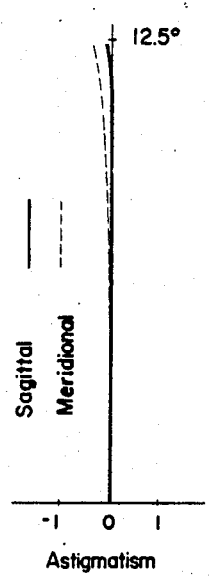
Figure 3A:
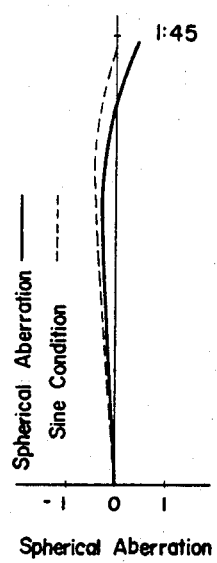
FIGURES 3(A), 3(B) and 3(C) illustrate the corresponding aberration curves of said lens system at its long focal length; wherein the lenses are designated 1 to 15 consecutively, the faces of lenses 1 to 6 are designated 1 to 12 consecutively, the faces of lenses 7 to 10 are designated 12 to 19 and the faces of lenses 11 to 15 are designated 19 to 28, $n_n$ is the index of refraction of the subscript designated lens, and $l$ is a unit of length.
Figure 3B:
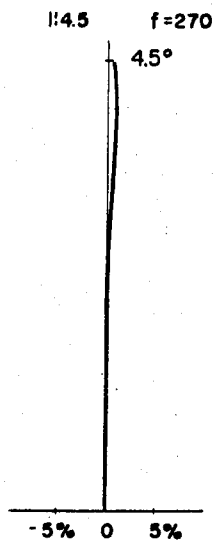
Figure 3C:
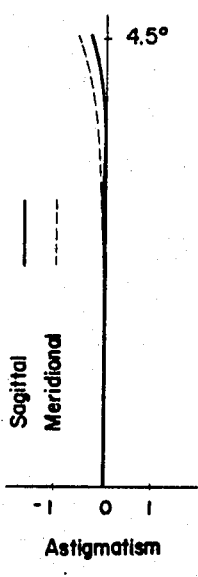

The Seidel coefficient sums are converted values with $f=1$. The aberration characteristics of this lens system are indicated in FIGURES 2 and 3.

While there has been described and illustrated a preferred embodiment of the present invention it is apparent that numerous alterations, omissions and additions may be made without departing from the spirit thereof.

What is claimed is:

1. A variable focus lens system comprising fifteen lenses arranged in four lens groups successively designated 1 to 4 including four lenses, four lenses, three lenses and four lenses respectively said second and fourth lens groups being axially movable relative to said first and third lens groups, said first lens is a positive lens with a rearwardly convex rear face, said second lens is a double concave lens, said third lens is a positive lens with a rearwardly convex rear face, said fourth lens is a positive lens with a forwardly convex front face and rearwardly concave rear face, said fifth lens is a negative lens with a rearwardly concave rear face, said sixth and seventh lenses are positive and negative respectively and are cemented at their confronting mating faces to form a unit, the curvature of said mating faces being rearwardly convex, said eighth lens is negative with a forwardly concave front face, said ninth lens is negative with a forwardly concave front face and a rearwardly convex rear face, said tenth and eleventh lenses are negative and positive respectively and are cemented at their confronting mating faces which are rearwardly concave to form a unit, said twelfth lens is doubly convex, said thirteenth lens is doubly concave, said fourteenth lens is a negative lens with a forwardly concave front face and a rearwardly convex rear face and said fifteenth lens is doubly convex.

2. A variable focus lens system as in claim 1 possessing the following dimensions and relationships:

|    | r        | d          | n           |
|----|----------|------------|-------------|
| 1  | ∞        | 4.50       | 1.52630/51.0 |
| 2  | -166.077 | 3.00       |             |
| 3  | -99.000  | 1.50       | 1.60562/43.9 |
| 4  | 231.100  | 2.00       |             |
| 5  | 465.000  | 8.50       | 1.51633/64.1 |
| 6  | -89.613  | 0.10       |             |
| 7  | 96.500   | 4.00       | 1.51633/64.1 |
| 8  | 164.013  | 5.00~101.98 |             |
| 9  | -350.000 | 2.50       | 1.72000/50.3 |
| 10 | 387.539  | 2.50       |             |
| 11 | -550.000 | 6.00       | 1.74077/27.7 |
| 12 | -63.385  | 2.50       | 1.67000/51.7 |
| 13 | 351.918  | 2.84       |             |
| 14 | -200.000 | 1.50       | 1.72000/50.3 |
| 15 | 1148.125 | 105.00~8.02 |             |
| 16 | -46.500  | 2.84       | 1.64000/60.2 |
| 17 | -63.780  | 0.28       |             |
| 18 | -1370.000 | 2.13      | 1.60562/43.9 |
| 19 | 60.960   | 10.00      | 1.65160/58.5 |
| 20 | -102.539 | 13.001~1.99 |             |
| 21 | 47.000   | 8.00       | 1.65100/55.8 |
| 22 | -317.405 | 7.50       |             |
| 23 | -169.000 | 3.00       | 1.74000/28.2 |
| 24 | 101.145  | 50.68      |             |
| 25 | -27.500  | 2.50       | 1.72342/38.0 |
| 26 | -48.171  | 0.15       |             |
| 27 | 200.000  | 5.80       | 1.69895/30.0 |
| 28 | -124.236 |            |             | wherein the faces of lenses 1 to 6 are designated 1 to 12 consecutively, the faces of lenses 7 to 10 are designated 12 to 19 and the faces of lenses 11 to 15 are designated 19 to 28, $n$ is the index of refraction of the designated lens, and $r$ is the radius of curvature of the designated lens face.

References Cited

FOREIGN PATENTS 975,309   11/1964   Great Britain.

JOHN K. CORBIN, Primary Examiner

U.S. Cl. X.R.

350—214